O. R. HUNT.
ARTICLE COMPRISING CLIP CONNECTED RELATIVELY MOVABLE ELEMENTS.
APPLICATION FILED MAY 22, 1917.
1,262,196.
Patented Apr. 9, 1918.
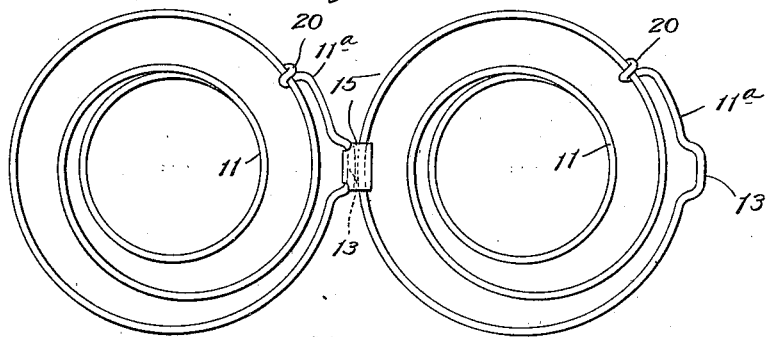
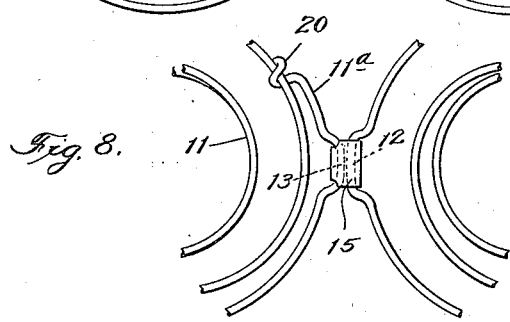
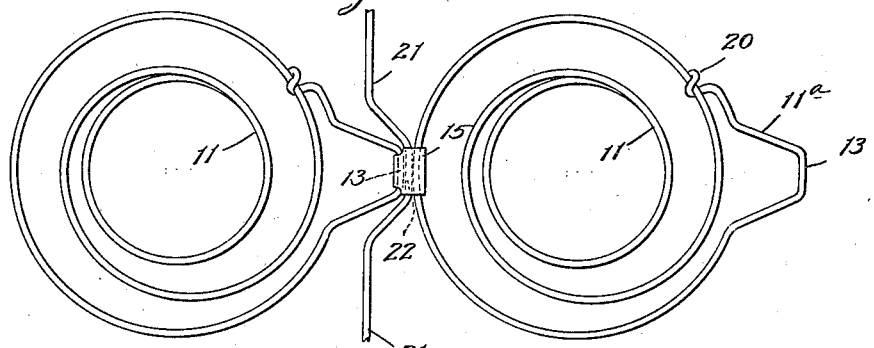
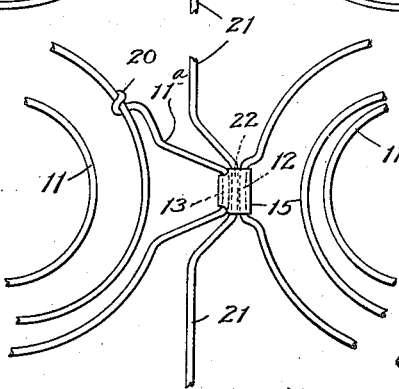

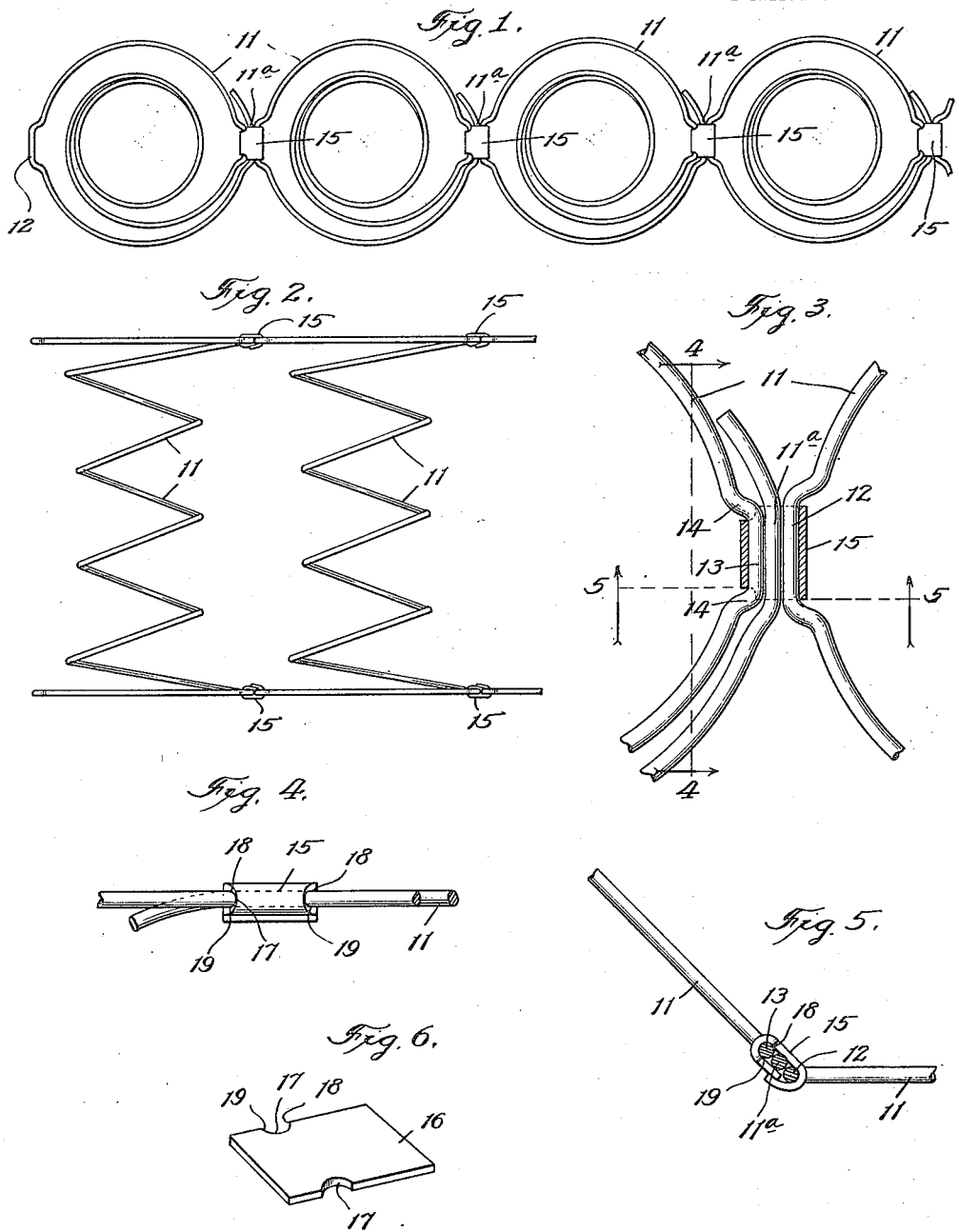

UNITED STATES PATENT OFFICE.

OZELLO R. HUNT, OF CHICAGO, ILLINOIS.

ARTICLE COMPRISING CLIP-CONNECTED RELATIVELY MOVABLE ELEMENTS.

1,262,196.

Specification of Letters Patent.   Patented Apr. 9, 1918.

Application filed May 22, 1917.   Serial No. 170,174.

*To all whom it may concern:*

Be it known that I, OZELLO R. HUNT, a citizen of the United States, residing at 1414 W. Van Buren st., Chicago, in the county of Cook and State of Illinois, have invented a new and useful Improvement in Articles Comprising Clip-Connected Relatively Movable Elements, of which the following is a specification.

I have devised my improvement for use more particularly in connection with spring-structures such as mattresses, cushions, and the like, involving spring elements connected together in a manner to permit the elements to move relative to each other.

In structures of this kind it is desirable that the spring elements be connected together in such a way that they may have the desired relative movement, but shall not become overlapped, as is possible where each clip is pivotally connected with both of the spring-elements connected together thereby.

My primary object is to provide for the connecting together of adjacent relatively movable elements to permit of the desired relative movement of said elements without danger of overlapping, by means which shall be simple of construction, economical of manufacture, readily applicable to operative position, and positively operating; and other objects as will be manifest from the following description.

Referring to the accompanying drawings wherein I have shown my invention as embodied in a number of different forms of construction involving spiral spring elements:

Figure 1 is a plan view of a plurality of spiral springs connected together to be movable relative to each other, in accordance with my invention.

Fig. 2 is a view in side elevation of two of the springs shown in Fig. 1.

Fig. 3 is an enlarged horizontal plan view of the adjacent portions of two contiguous spiral springs of Fig. 1, with the connecting clip therefor shown in section.

Fig. 4 is a view taken at the line 4—4 on Fig. 3 and viewed in the direction of the arrows.

Fig. 5 is a view taken at the line 5—5 on Fig. 3 and viewed in the direction of the arrows.

Fig. 6 is a perspective view of the blank from which the clip shown in the preceding figures is formed.

Figs. 7, 8, 9 and 10 are views like Fig. 1 of other arrangements involving my invention, portions of the springs in Figs. 8 and 10 being omitted.

It may be stated as a premise to the following description that I have illustrated only so many of the spring elements as is desirable to clearly explain my invention, it being understood that in practice these spring elements flexibly connected as hereinafter described, would be provided of a number and so arranged, in accordance with common practice, as to provide the desired amount of cushioning surface.

Referring to the construction illustrated in Figs. 1 to 6 inclusive, coiled upholstery springs are represented at 11, these springs being arranged side by side and as to their general construction the same as are commonly provided, excepting that the convolutions at the upper and lower ends of the springs are deflected at diametrically opposed portions thereof, as represented at 12 and 13, the deflected portions 13 being of less length than the deflected portions 12, and providing shoulders 14 at opposite ends of each deflected portion 13. Adjacent ones of the springs 11 are connected together through the medium of clips represented at 15. The clips 15 in accordance with the preferred embodiment of my invention are formed from blanks like that represented at 16 in Fig. 6 and which is preferably of ductile metal adapting it to be bent to the desired form, the clip being provided at opposite edges and adjacent one end thereof with arc-shaped notches 17. In assembling the clips with the springs the blank 16 is inserted into the space between the pairs of shoulders 14 at the inside of the spring to cause the shoulders 14 to extend within the notches 17, whereupon the blank is bent to the position shown in Fig. 5 to become looped over the deflected sections 12 and 13 of the springs, the free end 11ª of the adjacent spring lying between the portions 12 and 13 and within the clip, as shown in Fig. 3 thereby securing this portion of the spring and avoiding the necessity of knotting the same.

Inasmuch as the notches 17 receive the shoulders 14, the opposed shoulders 18 and 19 of the clip, formed by the notches 17, lie at opposite sides of the shouldered portions 14 thus interlocking with the latter and holding the clips 15 against pivotal movement on the spring with which it engages at its notched portions 17, the clip having pivotal connection with the spring engaging its opposite end. Thus while the springs of a spring-structure constructed according to the foregoing description, are permitted to move relative to each other to the desired degree for all practical purposes, it is impossible in this relative movement for one spring to become overlapped with an adjacent spring, this being made clear by the showing in Fig. 5 which represents the action of the spring elements and the clip connection when greater pressure is applied to the right-hand spring 11 of this figure than to the left-hand one thereof.

The arrangement shown in Fig. 7 is the same as that shown in Fig. 1, except that the deflections 12 are omitted and the clip pivots on an undeflected portion of the right-hand spring in this figure, the deflections 13 being provided at the extreme peripheries of the springs, and the free ends 11ª of the springs, instead of being held in place by the clips, are knotted around an adjacent portion of the spring, as represented at 20, in accordance with common practice.

The construction shown in Fig. 8 is the same as that shown in Fig. 7, excepting that each spring, in addition to the deflection 13, has a diametrically opposed deflected portion 12 like that shown in Fig. 1 and to which the clip 15 is pivotally connected.

In the arrangement shown in Fig. 9 the springs are like those shown in Fig. 7 excepting that the deflected portions 13 are caused to extend a greater distance from the center of the springs than in the case of Fig. 7, to render the springs more widely spaced, and provision is made, by means which pass through the clips 15 connecting adjacent sets of springs, for tying adjacent sets of springs together. Such means are represented at 21 and comprise a wire which has a deflected portion 22 passing through the clip 15 between the deflected portion 13 of one spring and the adjacent portion of the opposite spring for holding the wire 21 and the transversely disposed series of springs 11, against relative transverse movement, it being understood that the wire 21 which would be anchored at its opposite ends to the frame structure of the mattress, or to any other suitable part of the latter, would have the deflections 22 of a number corresponding with the number of transversely disposed series of springs.

The arrangement shown in Fig. 10 is substantially like that shown in Fig. 9 excepting that each spring has a diametrically opposed deflection 12.

It will be understood from the foregoing description that a spring-structure constructed in accordance with my invention may be made relatively economically and is positively operating to perform the function of preventing the springs from becoming overlapped in their movement relative to each other.

While I have illustrated and described a certain form of clip and have shown it as incorporated in certain arrangements and forms of springs, I do not wish to be understood as intending thereby to limit my invention as the same may be variously otherwise modified and altered without departing from the spirit of my invention, it being my intention to claim my invention as fully and completely as the prior state of the art will permit.

What I claim as new and desire to secure by Letters Patent is:—

1. In a structure comprising relatively movable elements, one of said elements having a shoulder extending outwardly therefrom, a clip flexibly connected with the other of said elements and looped over the one of the elements having said shoulder, said clip having a cut-away portion forming a shoulder at an edge thereof interlocking with the said shoulder on one of said elements, for the purpose set forth.

2. In a structure comprising relatively movable elements, one of said elements having an outwardly extending shoulder, a clip flexibly connected with the other of said elements and looped over the one of the elements having said shoulder, said clip having cut-away portions, shoulders at an edge thereof interlocking with the upper and lower surfaces of the said shoulder on one of said elements, for the purpose set forth.

3. In a structure comprising relatively movable elements, one of said elements having outwardly extending spaced shoulders, a clip flexibly connected with the other of said elements and looped over the one of the elements having said shoulders and between said shoulders, said clip having cut-away portions forming shoulders at opposite edges thereof interlocking with the said shoulders on one of said elements, for the purpose set forth.

OZELLO R. HUNT.